United States Patent
Peterson

[15] 3,646,980
[45] Mar. 7, 1972

[54] JET ENGINE COWL COVER
[72] Inventor: Fred D. Peterson, Belmont, Calif.
[73] Assignee: Peterson Products of San Mateo, Inc., Belmont, Calif.
[22] Filed: June 15, 1970
[21] Appl. No.: 46,071

[52] U.S. Cl. ............................................. 150/52 R, 138/89
[51] Int. Cl. ............................................................. B65d 65/02
[58] Field of Search .............. 150/52 R; 206/46 M; 244/53 B; 215/41, DIG. 1; 138/96 R, 89

[56]           References Cited

UNITED STATES PATENTS

| | | | |
|---|---|---|---|
| 2,744,382 | 5/1956 | Sokol et al. | 60/39.09 DP |
| 3,194,525 | 7/1965 | Webb | 206/46 M |
| 3,400,902 | 9/1968 | King | 244/53.8 |

FOREIGN PATENTS OR APPLICATIONS

| | | | |
|---|---|---|---|
| 310,132 | 4/1969 | Sweden | 215/41 |

Primary Examiner—Joseph R. Leclair
Assistant Examiner—Stephen P. Garbe
Attorney—Townsend and Townsend

[57]          ABSTRACT

A cowl cover for placement over the intake opening of jet engine nacelles and the like which has a substantially rigid, lightweight outer ring constructed to fit into the opening and which includes stop means limiting the inward movement of the ring into the nacelle. The periphery of a translucent plastic sheet is tautly secured to the ring to close the nacelle opening when the ring is in place. The exterior surface of the ring includes a gasket that seals the ring to the nacelle and which applies a releasable force biasing the cowl cover against the nacelle. The plastic sheet includes a V-shaped slit so that a center portion of the sheet can be opened to provide access into the nacelle interior through the sheet and which can, thereafter, be closed to protect the nacelle interior from the atmosphere and atmospheric contaminants.

14 Claims, 4 Drawing Figures

PATENTED MAR 7 1972
3,646,980
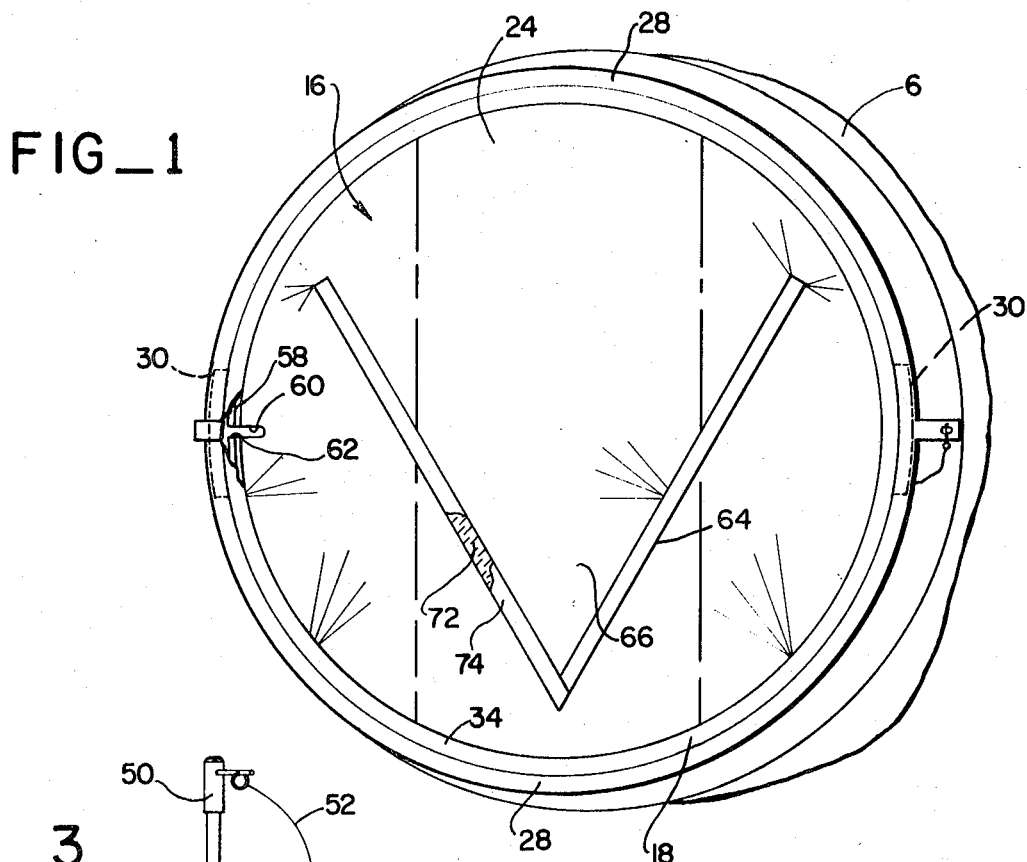
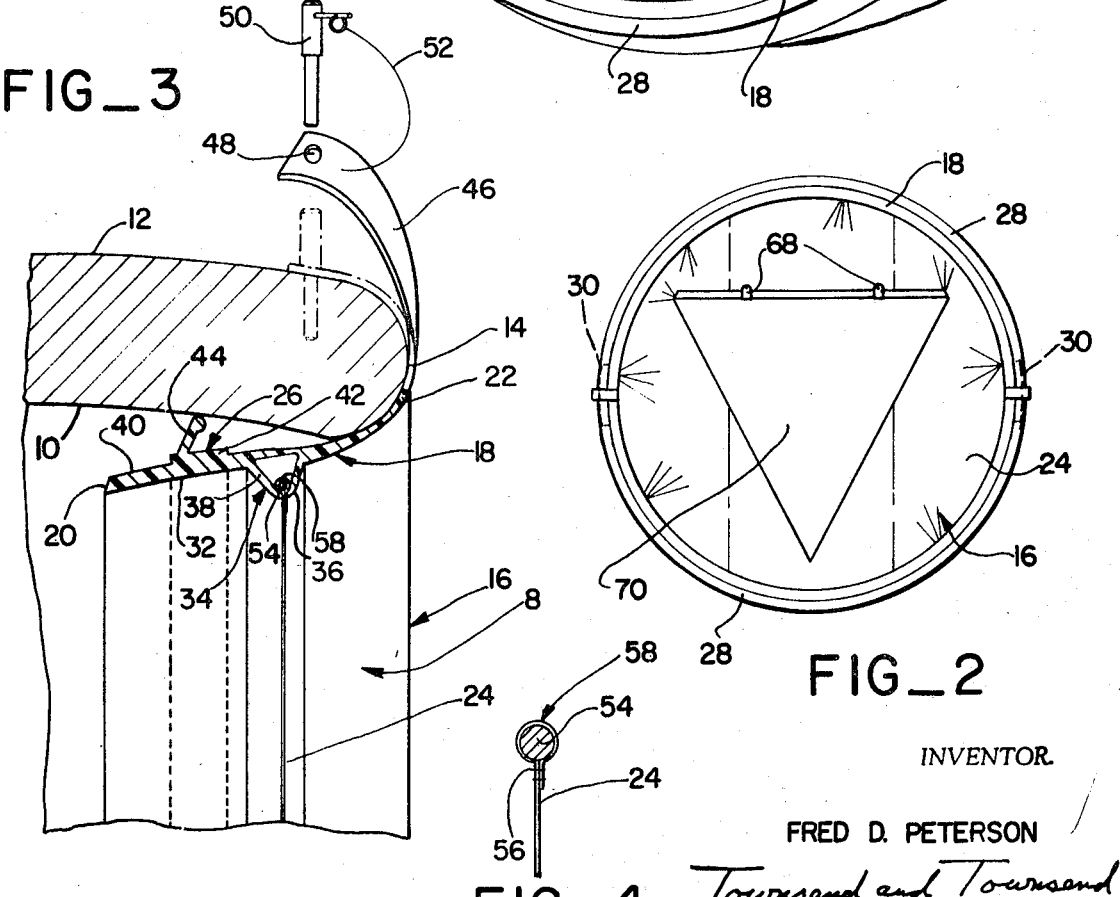
INVENTOR.
FRED D. PETERSON
*Townsend and Townsend*
ATTORNEYS

JET ENGINE COWL COVER

BACKGROUND OF THE INVENTION

Intake openings of jet engine nacelles, rocket engine nozzles and similar apertures leading to sophisticated equipment and machinery that is stored in the open and must be protected from contamination is presently covered with a variety of reusable or disposable, rigid or collapsible lightweight or relatively heavy protective covers. The covers must provide a good seal, usually a substantially or fully dust-proof seal, and, particularly in instances where they are frequently removed from the hole being covered, they should have physical characteristics which make them easy to use without the need for elaborate and expensive handling equipment. With increasing size of the covers they generally lend themselves less and less for easy handling.

Recently large aircraft have been introduced which carry several hundred passengers at a time and which employ jet engines that have intake or nacelle openings as large as 8 feet in diameter and more. Covers for such openings become prohibitively heavy when constructed in accordance with the prior art, are difficult to handle, clumsy and, due to their size, are dangerous to use under high-wind conditions as particularly frequently encountered in the vicinity of airports. Generally prior art engine covers comprise molded reinforced plastic dished-in covers that were placed across the nacelle openings. Such constructions are entirely satisfactory for covers of diameters up to about four feet. For larger sizes, however, such covers become too clumsy to handle and are liable to break under use due to the relatively large forces to which they are subjected during handling.

SUMMARY OF THE INVENTION

The present invention provides a lightweight cover for jet engine nacelle openings and the like that is easy to construct, relatively inexpensive and that can be handled without the need for special handling equipment even though it may have diameters of as much as eight feet and more. Briefly, the cover comprises a lightweight annular frame sized to loosely fit into the opening and flexible sealing means projecting radially outward from an exterior of the frame engaging a portion of the structure. The flexible means frictionally engages the structure and thus removably retains the frame to the structure. A thin, flexible sheet is disposed interiorally of the frame and secured thereto at its periphery.

In the preferred embodiment of the invention the frame or cover ring is constructed of two identical, rigidly connected halves to minimize manufacturing cost. The sheet comprises a translucent, thin plastic sheet that is secured to the ring and which includes a V-shaped slit that is wholly contained within the sheet. Means are provided for opening and closing the slit and for retaining the portion of the sheet enclosed by the slit in a rolled-up position to provide a generally triangular, large central opening through the sheet and the cover.

This opening substantially reduces wind forces acting on the cover so that it can be handled by two workmen, without the need for special equipment even under relatively high-wind conditions. Moreover, when secured to the nacelle the triangular opening through the cover provides access to the nacelle interior so that workmen can enter through the cover to inspect the engine or do necessary repair or cleaning work. Under adverse weather conditions the triangular opening through the plastic sheet can be closed. By virtue of the translucency of the plastic sheet workmen have sufficient light while they and the nacelle interior are protected from the elements.

BRIEF DESCRIPTION OF THE DRAWINGS

FIG. 1 is a perspective side elevational view of a large jet engine nacelle opening covered with a cowl cover constructed according to the present invention;

FIG. 2 is a front elevational view of the cover and shows the triangular access opening through the plastic sheet in an open position;

FIG. 3 is a fragmentary, enlarged cross sectional view of an upper portion of the nacelle and cowl cover; and FIG. 4 is an enlarged fragmentary cross sectional view of the periphery of the cowl inlet cover sheet.

DESCRIPTION OF THE PREFERRED EMBODIMENTS

Referring to the drawings, a jet engine nacelle 6 of a jet aircraft has a nacelle inlet 8 through which an airstream enters and flows towards a jet engine (not separately shown) housed within the nacelle. The nacelle has a generally circular cross section and is defined by an inner nacelle surface 10, a substantially concentric outer nacelle surface 12 and a substantially semicircular, annular front face 14 of the nacelle which interconnects the inner and outer nacelle surfaces. A cover 16 is placed across inlet 8 and protects the interior of the nacelle and the jet engine against contamination. Broadly speaking, the cover comprises a substantially circular outer frame or ring 18 which comprises an axially aft end 20 disposed interiorly of the cowl and an axially forward end 22 abutting front face 14 of the nacelle. The cover ring further mounts a thin circular cover sheet 24 which closes inlet 8 and a peripheral seal ring 26 that forms a dusttight seal between the cover ring and the interior nacelle surface.

Ring 18 is preferably constructed of two identical ring halves 28 the ends of which are securely fastened to each other by butt plates 30 and suitable fastening means such as rivets or threaded bolts (not shown). Such a construction of the cover ring enables the molding of the ring from fiber reinforced plastics in the form of a plurality of integral, axially joined ring halves which are, thereafter, severed. The need for large, space-consuming and expensive molds and molding machinery is thereby eliminated to reduce the manufacturing costs for the cover ring.

The cover ring has a generally S-shaped cross section, as best seen in FIG. 3, with forward end 22 flaring forwardly and outwardly to provide it with rigidity and a contact area for abutment against front face 14 of the nacelle. The remainder of the cover ring tapers inwardly in an aft direction to give the ring a frustoconical configuration and thus sufficient rigidity so that it substantially retains its circular configuration when placed on the ground in an upright position. Insertion of the ring into the nacelle inlet is thereby substantially facilitated.

An inner side 32 of the cover ring includes a slitted track 34 defined by a pair of inwardly extending, converging, circumferentially arranged opposing arms 36 and 38 that are spaced apart adjacent their free, innermost ends. The slitted track is preferably constructed by forming a continuous track, that is by interconnecting arms 36 and 38 when molding the ring halves and by subsequently slitting the arms with suitable cutters. An outer surface 40 of the cover ring mounts seal ring 26 which comprises a base 42 secured, e.g., bonded, to the outer ring surface and a continuous, forwardly and outwardly extending skirt 44. The seal ring is constructed of a resilient, relatively soft material such as neoprene and the outermost diameter of the skirt 44 is selected to exceed the inner diameter of the portion of inner nacelle surface 10 overlying seal ring 26 when the seal ring is in its relaxed position. When cover 18 is placed in nacelle inlet 8 skirt 44 is radially compressed towards the center of the nacelle and thereby forms a dust seal preventing contamination of the nacelle interior through the entrance of dust particles between the nacelle and the abutting cover ring. Moreover, the compressed skirt generates a force biasing ring 18 in an aft direction towards the interior of the nacelle. To remove the ring from the nacelle inlet a forwardly acting force must be applied to overcome the biasing force from the skirt.

A plurality, preferably four equally spaced straps 46 constructed of a flexible, relatively strong material such as nylon webbing, are secured to cover ring 18 adjacent forward end 22 thereof. The straps have a sufficient length so that they can be wrapped about nacelle front face 14 and their outermost ends include apertures 48 which are so positioned that they are aligned with a bore (not separately shown) in outer nacelle surface 12 provided by many aircraft manufacturers. A lock pin 50 is loosely secured to each strap with suitable strings or cables 52 and can be inserted through aperture 48 in the bores in outer nacelle surface 12 to mechanically secure cover ring 18 to the nacelle and to provide a further limit for the rearward movement of the ring into the nacelle interior.

Cover sheet 24 has a substantially circular configuration and is constructed of a lightweight, high strength translucent material such as vinyl or nylon, preferably florescent colored for safety purposes, and its radially outermost portion is doubled over (as best seen in FIG. 4) and stitched. A flexible member such as a rope 54 is placed in and firmly retained to the doubled over portion of the cover sheet to form a peripheral bead 58 that has a transverse dimension greater than the width of the slit between arms 36 and 38 of slitted track 34. The cover sheet further includes a narrow radially oriented slot 60 that extends from a point radially inward of the bead past the bead so that the bead extends over less than 360° of the periphery of the cover and terminates at opposing bead ends 62. The bead is so dimensioned that the cover sheet remains firm and taut when the bead is retained between opposing arms 36 and 38 of the slitted track.

The cover sheet further includes a generally channel shaped and preferably V-shaped slit 64 that is wholly contained within the periphery of the cover sheet and which defines a generally triangularly shaped openable inner portion 66 of the sheet that can be rolled up and retained in the rolled up position with snap fasteners 68 to define a cover or access opening 70. On large diameter inlet covers, such as the ones for the above referred to large jet aircraft, the access opening through cover sheet 24 is sufficiently large to form a manhole through which workmen can readily pass.

Means such as heavy duty zippers 72, preferably provided with inside and outside pulls (not separately shown) permitting the opening and closing of the zippers from either side of the cover sheet, are provided for releasably securing opposing, V-shaped slit 64 defining edges of the cover to each other and, thereby, close the access opening. A protective flap 74 is preferably provided to protect the zippers against contamination.

The nacelle inlet cover 16 of the present invention is assembled by first securing one pair of opposing ends of ring halves 28 with a butt plate 30. The other, opposite end of the half remains loose. Cover sheet 24 is now installed by aligning one bead end 62 with the end of a slitted track 34 in one of the ring halves and pulling that end into the slitted track and around the track through 360°. At that point the other bead end 62 begins to enter the slitted track and cover sheet 64 is, therefore, fully secured to cover ring 18. The other butt plate 30 is now installed to secure the other ends of ring halves 28. Thereafter seal ring 26 is bonded to outer surface 40 of the cover ring and the cover is ready for installation.

To install the cover it is axially aligned with nacelle inlet 6 and pushed in an aft direction until forward end 22 of ring 18 abuts nacelle front face 14. Skirt 44 of seal ring 26 now forms a dust tight seal and gently biases the cover towards the nacelle interior and, thereby, retains the forward end of the ring in abutment with the nacelle. Straps 46 are further secured to the nacelle with lock pins 50 so that the nacelle interior is fully protected against contamination. The lightweight construction of the cover enables its handling by two persons without the need for special handling equipment such as hoists or the like. If wind conditions exist during the installation of the cover, or while it is transported, e.g., carried, towards a parked aircraft, zippers 72 are released and the openable portion 66 of the sheet is rolled up and secured with snap fastener 68 to reduce the wind surface and prevent excessive wind forces from endangering personnel or the cover.

When the cover is installed engine inspections or repair work can be performed by opening portion 66 of the sheet to form access opening 70 through which workmen can enter the interior of the nacelle. Under adverse weather conditions, as during rain or snow storms of extremely low temperatures, the access opening can be closed while the workmen are inside the cover. He can continue his tasks by virtue of the light transmitted into the nacelle interior past the translucent cover sheet 24.

I claim:

1. Apparatus for temporarily covering large diameter openings defined by a structure comprising: a lightweight annular frame sized to loosely fit into the opening, flexible sealing means projecting radially outward from an exterior of the frame engaging a portion of the structure, the flexible means being formed to frictionally engage the structure and thus removably retain the frame to the structure, a thin, flexible sheet separate of and disposed interiorally of the frame, and means securing a periphery of the sheet to the frame.

2. Apparatus according to claim 1 wherein interior portions of the sheet are separated, and including means releasably securing the separated portions to each other whereby release of the separated portions causes the formation of a cutout in the sheet to reduce the wind resistance of the apparatus and retention of the separated portions to each other closes the opening.

3. Apparatus according to claim 1 wherein the frame is constructed of identical frame halves, and including means rigidly securing the frame halves to each other.

4. Apparatus according to claim 3 wherein the sheet retention means comprises a pair of radially inwardly facing converging annular arms connected to the frame, free ends of the arms being spaced apart a substantially constant distance over the full annular length of the arms, and means defining the periphery of the sheet and having a thickness greater than the spacing between the free arm ends, the periphery defining means being disposed in a space between the frame and the arms.

5. A cowl cover for placement over intake openings of jet engine nacelles and the like for protecting the nacelle interior during storage and nonuse comprising: a ring having axially spaced first and second ends, the first end having a lesser diameter than the nacelle opening and the second end having a greater diameter than the nacelle opening, means connectable to the nacelle limiting movement of the ring into the nacelle opening, means releasably engaging the nacelle retaining the ring in the opening, and a flexible sheet having a periphery secured to the ring and closing the nacelle opening, the sheet including means permitting the opening and closing of a portion of the area closed by the sheet for reducing wind drag on the cover to facilitate the handling and ground transportation of the cover.

6. A cover according to claim 5 wherein the sheet has a generally channel shaped slit wholly disposed within the periphery, and wherein the means for opening and closing comprises means releasably securing opposing edges of the sheet defining the slit to each other.

7. A cover according to claim 6 wherein the slit is substantially channel shaped permitting rollup of a sheet portion included by the slit, and including means retaining the rolledup sheet portion in a rolledup position to form an entrance and exit manhole into the nacelle interior while the cover is in place.

8. A cowl cover according to claim 5 wherein the ring retention means comprises a resilient member secured to the periphery of the ring, engaging an interior surface of the nacelle and biasing the ring towards the nacelle interior.

9. A cowl cover for use on jet engine nacelles having large diameter intake openings in excess of about 4 feet, the nacelle defining radially spaced inner and outer surfaces interconnected by a curved front face, the cover comprising: a ring for placement against the nacelle, the ring having an aft end of a lesser diameter than the diameter of the inner nacelle surface adjacent the front face and an axially spaced forward end of a diameter exceeding the diameter of the inner surface at the front face for engaging the front face, the ring being constructed of a plurality of identical sections and including means rigidly interconnecting the sections, strap means extending from the forward ring end and having free ends for pinning the strap means to the outer surface to retain the ring to the nacelle and limit its maximum axial movement into the nacelle, a gasket ring having a base secured to an exterior side of the ring and a resilient sealing portion extending away from the base in a direction towards the forward end of the ring, the maximum diameter of the gasket ring when in a relaxed position exceeding the inner diameter of the portion of the inner surface against which the gasket rests when the forward end of the ring engages the front face of the cowl to thereby seal the ring to the interior surface and releasably retain the ring against forward movement to the nacelle, the ring further including opposing, radially inwardly facing and converging arms separated by a substantially constant width slot, and a cover sheet having a channel shaped slit wholly disposed within the periphery of the sheet and means releasably retaining slit defining edges of the sheet to each other to enable the opening and closing of the cover for wind drag reduction and for providing access to the nacelle interior while the cowl cover is installed, the sheet including a substantially circular bead disposed between the arms and having a transverse dimension greater than the width of the slot, the bead having a diameter about equal to the diameter of the arms radially outward of and adjacent the slot for maintaining the cover taut.

10. A cowl cover according to claim 9 wherein the bead extends over less than 360° to define spaced apart ends whereby the bead can be threaded between the arms upon release of a ring section connecting means.

11. A cowl cover according to claim 9 wherein the gasket extends over 360° and is constructed of a relatively soft material to form a tight seal against the interior nacelle surface, and wherein the ring is constructed of fiber reinforced plastic and the cover sheet is constructed of nylon whereby the cover can be lifted by persons without the need for mechanical lifting aids.

12. A cowl cover according to claim 9 wherein the bead is defined by a flexible rope disposed within a pouch defined by a doubled over outermost peripheral port on of the cover sheet, and including means securing the doubled over ends of the portion to the remainder of the cover.

13. A cowl cover according to claim 9 including a notch extending radially inwardly from an outermost periphery of the cover sheet past the bead, and wherein the bead ends at the notch.

14. A cowl cover according to claim 9 wherein the cover is constructed of a relatively translucent material whereby workmen can work within the nacelle when the cowl cover is in place.

* * * * *